July 5, 1949.　　　　　J. KOSASH　　　　　2,475,101
FISH LURE
Filed Feb. 27, 1946
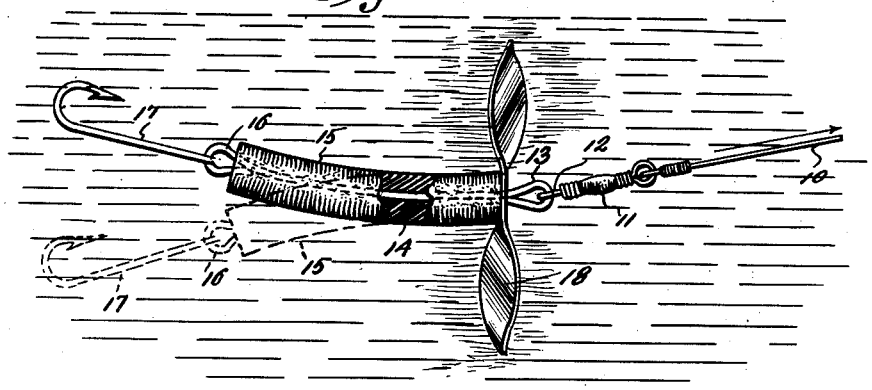
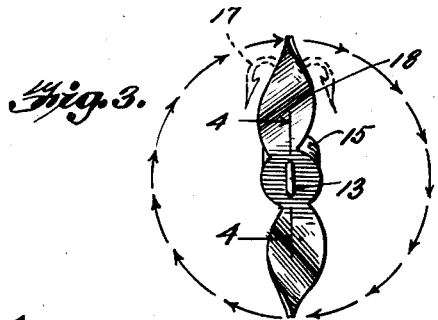
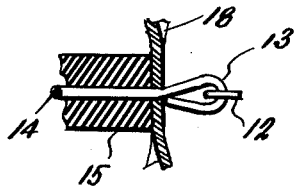
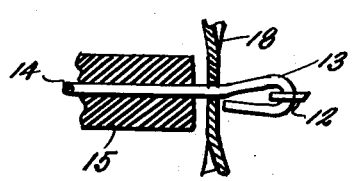
Inventor
JOHN KOSASH
By Randolph & Beavers
Attorneys Patented July 5, 1949

2,475,101

UNITED STATES PATENT OFFICE 2,475,101

FISH LURE

John Kosash, Lorain, Ohio, assignor to
M. C. Kolczun, Lorain, Ohio

Application February 27, 1946, Serial No. 650,509

1 Claim. (Cl. 43—42.46)

This invention relates to fish lures and particularly to the spinner type.

An object of the invention is to provide a lure that will cause the hook, or hooks, to rotate and wobble at the same time.

Another object is to provide a lure that may be disconnected from the rotative element.

And another object is the provision of a lure that may be made inexpensively.

The manner of accomplishment of the above and other objects will become apparent from a reading of the specification when taken in connection with the accompanying drawing, in which:

Figure 1 is a side elevation of the device;

Figure 2 is a top plan view thereof;

Figure 3 is a front elevation of the propeller;

Figure 4 is a fragmentary sectional view, taken on the line 4—4 of Figure 3, and Figure 5 is a fragmentary sectional view, partly in elevation, which illustrates the means for disconnecting the hooks from the propeller.

Referring now to the drawing, the numeral 10 refers to a tow line, which is connected to a swivel 11. The swivel 11 has a loop 12 thereon which connects with, and is fastened to, a loop 13, the latter being located on the forward end of the wire 14.

The wire 14 extends through a tubular member 15, which is preferably made of rubber, and it may be made in different colors, in order to attract different species of fish.

The rearward end of the wire 14 has a loop 16 thereon to which is attached the hook 17.

The propeller 18 will be rotated by the action of being pulled through the water and it, in turn, will rotate the wire 14 and thereby rotate the hook 17.

In order to impart to the hook 17 a wobbling movement in addition to rotation, I bend the wire 14, the curvature of which will cause the hook 17 to wobble, and the tube 15, being made of a resilient material will curve with the wire 14.

Under some conditions it is preferable that the hook does not rotate and in order to prevent rotation thereof, the tube 15 may be slid rearwardly, out of contact with the propeller 18, thus allowing the propeller to run free around the wire 14.

While I have described and illustrated the preferred embodiment of the invention it should be understood that various modifications may be made while keeping within the scope of the claim.

What I claim is:

A fish lure comprising an elongated body of resilient material having an opening therethrough, a curved rigid member disposed longitudinally through the body and being snugly slidable therein, an eye at each end of the rigid member, a forward one for the attachment of a fish line and a rearward one to carry a fish hook, and an impeller mounted on the rigid member adjacent the forward eye and being free to rotate on said rigid member, said rigid member being adapted to be slid rearwardly in the body to clamp the impeller between the forward end of the body and the adjacent eye to cause said body to rotate with the impeller and produce a wobbling motion.

JOHN KOSASH.

REFERENCES CITED

The following references are of record in the file of this patent:

UNITED STATES PATENTS

| Number | Name | Date |
|---|---|---|
| 79,446 | Christian | June 30, 1868 |
| 671,613 | Shakespeare et al. | Apr. 9, 1901 |
| 779,744 | Shakespeare | Jan. 10, 1905 |
| 1,777,004 | Lemere et al. | Sept. 30, 1930 |
| 2,045,703 | DuBois | June 30, 1936 |
| 2,079,335 | Pflueger | May 4, 1937 |
| 2,136,713 | Schnabel | Nov. 15, 1938 |